United States Patent [19]
Hirata

[11] 4,099,030
[45] Jul. 4, 1978

[54] SPEECH SIGNAL PROCESSOR USING COMB FILTER

[76] Inventor: Yoshimutsu Hirata, No. 10-307, 842, Arai, Hino, Tokyo, Japan

[21] Appl. No.: 792,405

[22] Filed: Apr. 29, 1977

[30] Foreign Application Priority Data

May 6, 1976 [JP] Japan ..................................... 51/51561

[51] Int. Cl.[2] .......................... G11B 15/20; H04B 1/66
[52] U.S. Cl. .............................. 179/15.55 T; 179/1 D
[58] Field of Search ............. 179/15.55 T, 1 SH, 1 D, 179/1 P, 1 SA, 1 SM; 360/8, 108, 30; 333/70 T

[56] References Cited

U.S. PATENT DOCUMENTS 3,459,894 8/1969 Hoyler .................................. 179/1 D
3,949,174 4/1976 Sutton ........................... 179/15.55 T

OTHER PUBLICATIONS

R. Brodersen et al., "New Technologies,", Science, vol. 195, Mar. 18, 1977.
F. Lee, "Time Compression and Expansion of Speech", J. of Aud Eng. Soc., Nov. 1972.

*Primary Examiner*—Kathleen H. Claffy
*Assistant Examiner*—E. S. Kemeny

[57] ABSTRACT

Disruptive discontinuities resulting from sampling in a time compression and expansion frequency transformation system are minimized by use of comb filters in the form of transversal filters.

28 Claims, 46 Drawing Figures

SPEECH SIGNAL PROCESSOR USING COMB FILTER

BACKGROUND OF THE INVENTION

1. Field of the Invention

This invention relates to sound or speech signal processors in which frequency transformation of a recorded sound signal is provided for the purpose of restoring the original frequency components of the signal. More particularly, the invention pertains to improved speech signal processors of the above-stated character in which a comb filter is connected at the input or output side of the signal processor to minimize noise components in the output signal.

2. Description of the Prior Art

Speech signal transformation processors which permit a speech signal input to be compressed or expanded in time so as to audibly reproduce the signal at its normal frequency spectrum are well known. Typical arrangements are exemplified by U.S. Pat. Nos. 1,671,151; 2,352,023; and 3,480,737. The systems disclosed in these patents, when used to reduce the frequency of a speech signal, while compressing the time in which a given segment of speech is reproduced, inevitably involve discarding a portion of the original speech wave. The ratio of the speech signal discarded to that which is retained is directly related to the compression ratio and the discard loss is inhererently and fundamentally related to this process of reducing the frequency and compressing the time for the processing of a given passage of speech. Since the portion of the speech which is reproduced alternates with portions which are discarded, the problem of merging to reproduce sections in continuous time slots presents some problem and various solutions have been offered.

U.S. Pat. No. 3,786,195, issued to Schiffman, suggests a signal controlled delay line disposed directly in a sound signal channel between the signal source and sound reproducer, which delay line is repeatedly sequenced between maximum and minimum delay values to modify the frequency-time characteristic of the sound reproduced from the original signal. This sytem provides signal processing at the point of juncture of two reproduced speech segments to suppress distracting noise components and also to avoid the introduction of false cues which could modify the information conveyed in the subsequent speech segment. To this end, the transition between successive reproduced speech samples are modified by simple transfer function selection or control, or the transition is eased by the introduction of synthetic or speech-derived signal portions to approximate a smooth transition within a time interval which does not lose actual cues and under such conditions that do not introduce false cues. This system has proved to be effective, but suffers from the disadvantage that the circuitry required is considerably complex.

OBJECTS AND SUMMARY OF THE INVENTION

It is, therefore, a general object of the present invention to provide an improved signal processor for sound or speech signals with a view to overcoming the above-stated disadvantages of the prior art systems.

It is a more particular object of the present invention to provide an improved speech signal processor using a comb filter provided for noise elimination.

It is another object of the present invention to provide an improved speech signal processor which uses a pair of analog shift registers capable of control for frequency transformation so as to restore the original frequency components of a recorded speech signal.

It is a further object of the present invention to provide an improved speech signal processor which is relatively simple in construction and which is suited to integrated circuit techniques.

In accordance with the principles of the invention, these and other objects are accomplished by providing a comb filter in the speech signal channel between the speech signal source and signal reproducer. More particularly, in one embodiment of this invention, a comb filter is provided at the input side of the processor to filter out those frequencies which would produce disruptive discontinuities due to sampling and reassembling their samples. In another embodiment of the invention, a comb filter is connected at the output side of the signal processor to suppress distracting noise components resulting from the discontinuity caused by periodically splicing a speech waveform. Frequency transformation, either up and down, is provided by using a pair of analog shift registers arranged in parallel and controlling the relative clock frequencies $f_1$ and $f_2$ for shift through each analog shift register and shift out from the successive stages of the register, respectively, to restore the normal frequency components to the input speech signal as it appears in the output reproducer. The ratio of frequency transformation between the signal applied at the input of each register and appearing at the output thereof is determined by the ratio of the clock frequencies $f_1$ and $f_2$, which ratio is either greater or less than unity for obtaining compression and expansion. The two analog shift registers are alternately used for the shift-through and shift-out purposes. When one shift register is accepting input samples, the other shift register is providing frequency-transformed signal samples for output. When the other shift register is receiving input samples, the one shift register is providing frequency-transformed signal samples for output. A combiner circuit is provided for combining or making contiguous two originally spaced signal portions of the speech wave from the analog shift registers to form a continuous speech signal waveform.

The novel features that are considered characteristics of this invention are set forth with particularity in the appended claims. The invention will best be understood from the following description when read in connection with the accompanying drawings.

DESCRIPTION OF THE PREFERRED EMBODIMENTS

Figure 1:
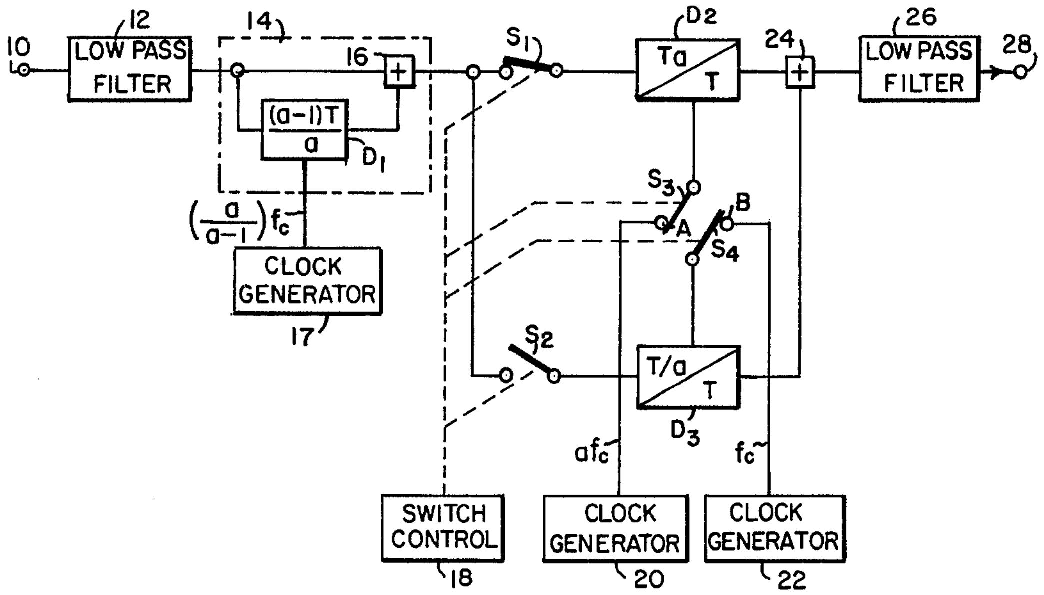
FIG. 1 shows a block diagram of a speech signal processor in accordance with the invention using a comb filter at the input side of the processor.

Reference is now made to FIG. 1 which illustrates a speech signal processor constructed in accordance with the teaching of the present invention. The signal processor is adapted to receive a speech signal which has been compressed in time by a variable speech playback device (not shown) and process the same so that an output audio signal can be obtained having the original frequency components of the signal and occupying a time duration which is smaller than the original time duration of the speech signal. The variable speech playback device may be a tape transport with a manual speech control, by which a magnetic tape having the speech signal recorded thereon is drawn past a magnetic pickup transducer. As is well known, speech compression is achieved by playing back the tape at a times the original recording rate ($a$ = the compression ratio). The signal derived from transporting the tape past the magnetic transducer is applied at an input terminal 10 and low pass filtered by a filter 12 which has a cutoff frequency lower than the sampling frequency to be described later.

The signal after passing through the low pass filter 12 enters a comb filter 14 which, in the illustrated embodiment, comprises a single stage feed-forward type circuit consisting of an analog shift register D1 and an adder 16. The analog shift register D1 is constructed of a charge transfer device such as a "bucket brigade" device sold under the designation MN3002 by Matsushita Electric Industrial Co. (Japan). A charge coupled device commonly called "CCD" which is of the type as disclosed in Kahng U.S. Pat. No. 3,700,932 may be used. The analog shift register D1 is supplied with clock signals from a clock generater 17 to sample the input signal and then effect a transfer of charges representative of such sampled signals from one "bucket" to the next in response thereto. By selecting the frequency of the clock signals to be an appropriate value greater than the double of input signal frequency, it is possible to provide the desired time delay for the analog shift register 14. As will be hereinafter described in detail, the analog shift register 14 is clocked so that it provides a delay time equal to $(a - 1/a)$T where $T = aT_s$ ($T_s$ = sampling time). The adder 20 arithmetically combines the the delayed and undelayed signals resulting in the desired comb filter characteristic. The comb filter 14, the function of which will be described later in detail, exhibits the frequency response characteristic defined as:

$$B = \cos(\pi Tf)$$

Figure 5:
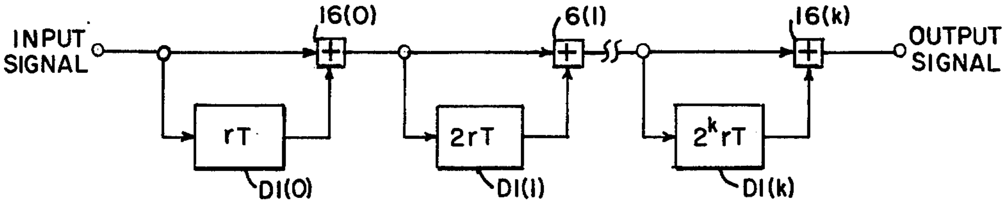
FIG. 5 shows a block diagram of a multi-stage feedforward type comb filter which can be used in place of the comb filter shown in FIG. 1.
Figure 6:
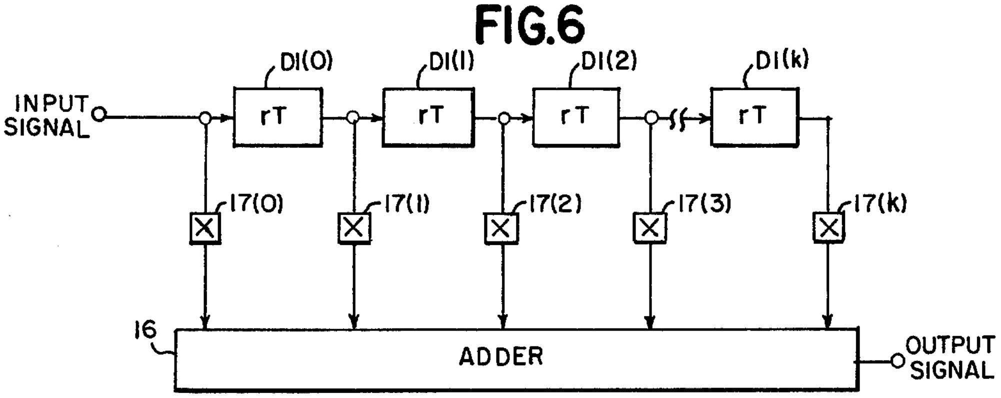
FIG. 6 shows a block diagram of a nonrecursive comb filter which may be employed instead of the comb filter shown in FIG. 1.

This means that for frequencies equal to $n\ (1/T)$ or $(n + \frac{1}{2})\ 1/T$ the adder 16 will cancel the delayed and undelayed signals. Thus, it will be appreciated that there are many alternate stop (or attenuation) and pass bands throughout the frequency spectrum of the band of signal energy to be transmitted. While the comb filter 14 illustrated in FIG. 1 comprises a single stage circuit, it should be understood that a multi-stage, preferably two-stage, feed-forward filter configuration could equally be employed to provide the required comb signal characteristic. One such example may comprise a cascade combination of the comb filter circuit of FIG. 1 with each stage consisting of an analog shift register and an adder. FIG. 5 shows another example of the multi-stage filter configuration in which the time delay, $r$T, $2r$T, . . . $2^k r$T, provided by each analog shift register is increased progressively by a factor of 2 with $r$ being equal to $a - 1/a$. The frequency response of this filter configuration is defined as $$B = 2^{k+1}\cdot\cos(r\omega T/2)\cos(r\omega T)\ldots\cos(2^{k-1}r\omega T)$$

where $k = 0, 1, 2, \ldots$. FIG. 6 shows a block diagram of a nonrecursive filter configuration which could also be utilized to perform the function of the filter of FIG. 1.

Figure 2:
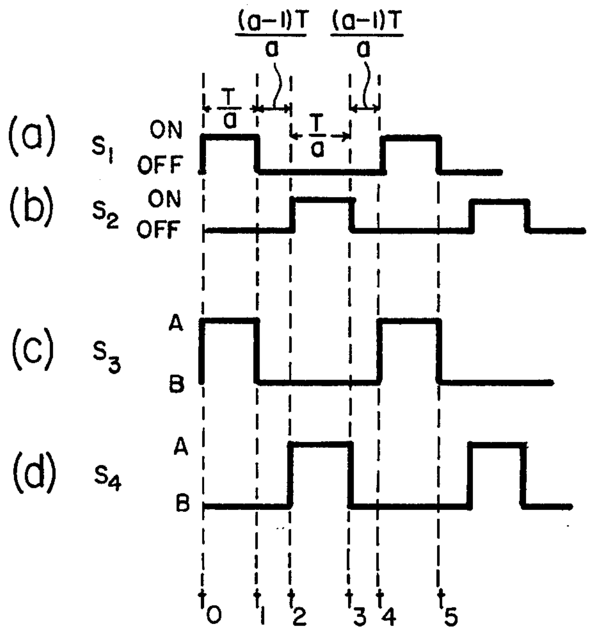
FIGS. 2(*a*) to 2(*d*) show graphically the operation of electronic switches $S_1$, $S_2$, $S_3$ and $S_4$ employed in the signal processor of FIG. 1.

Reference is made again to FIG. 1. The output of the comb filter 14 is applied to electronic switches $S_1$ and $S_2$ which are signal controlled between the "ON" and "OFF" states. The control signals are derived from a switch control circuit 18. As indicated in lines (*a*) and (*b*) of FIG. 2, $S_1$ and $S_2$ are alternately operated to sample the comb filter output during each "ON" or sampling time, T/*a*, at the sampling rate, 1/T.

The electronic switches $S_1$ and $S_2$ are connected to analog shift registers D2 and D3, respectively, so as to supply them with the sampled signals. The analog shift registers D2 and D3 may be constructed of a charge transfer device such as a 512-stage "bucket brigade" device similar to the analog shift register D1 employed in the comb filter 14. Each analog shift register D2 and D3 responds alternately to a first frequency clock or the input delay clock $af_c$ and a second frequency clock or the output scan clock $f_c$ by providing frequency-time transformation to cause speech signal inputs to be expanded in time. Alternate selection of the two clock frequencies $af_c$ and $f_c$ is accomplished by using electronic switches $S_3$ and $S_4$ which are signal controlled between a position A connecting to the input delay clock source 20 and a position B connecting to the output scan clock source 22. The control signals are also derived from the switch control circuit 18. It will be seen from lines (*c*) and (*d*) of FIG. 2 that the time during which the $S_3$ is in the position A coincides with the sampling time of $S_1$ while the time during which the $S_4$ is in the position A coincides with the sampling time of $S_2$. The electronic switches $S_1$ to $S_4$ may be of any know type. One such switch which has been employed to good advantage is an analog switch sold under the designation MC14016 by Motorola Inc.

Each analog shift register is used to store an input signal train of analog form, with the input delay clock $af_c$ used to shift the sampled version of the input signal stage-by-stage through the shift register at a rate determined by the clock. Incorporated in each analog shift register is a stage-by-stage readout register (not specifically shown) which permits sequential, parallel readout of the successive stages of the analog shift register, which parallel sequential readouts are combined to form an output signal. As will be appreciated by those familiar with the art, frequency transformation is achieved by controlling the relative clock frequencies for shift through the analog shift register and shift out from the successive stages of the register, thereby restoring the original frequency components to the input speech signal as it appears at the output. More detail on the construction and operation of the shift registers is set forth in U.S. Pat. No. 3,838,218. The resultant frequency transformed signals appearing at the output of each analog shift register are combined by a combiner or adder circuit 24 and then low-pass filtered by a filter 26 to produce the signal which is applied to an audio reproducer (not shown).

Figure 3:
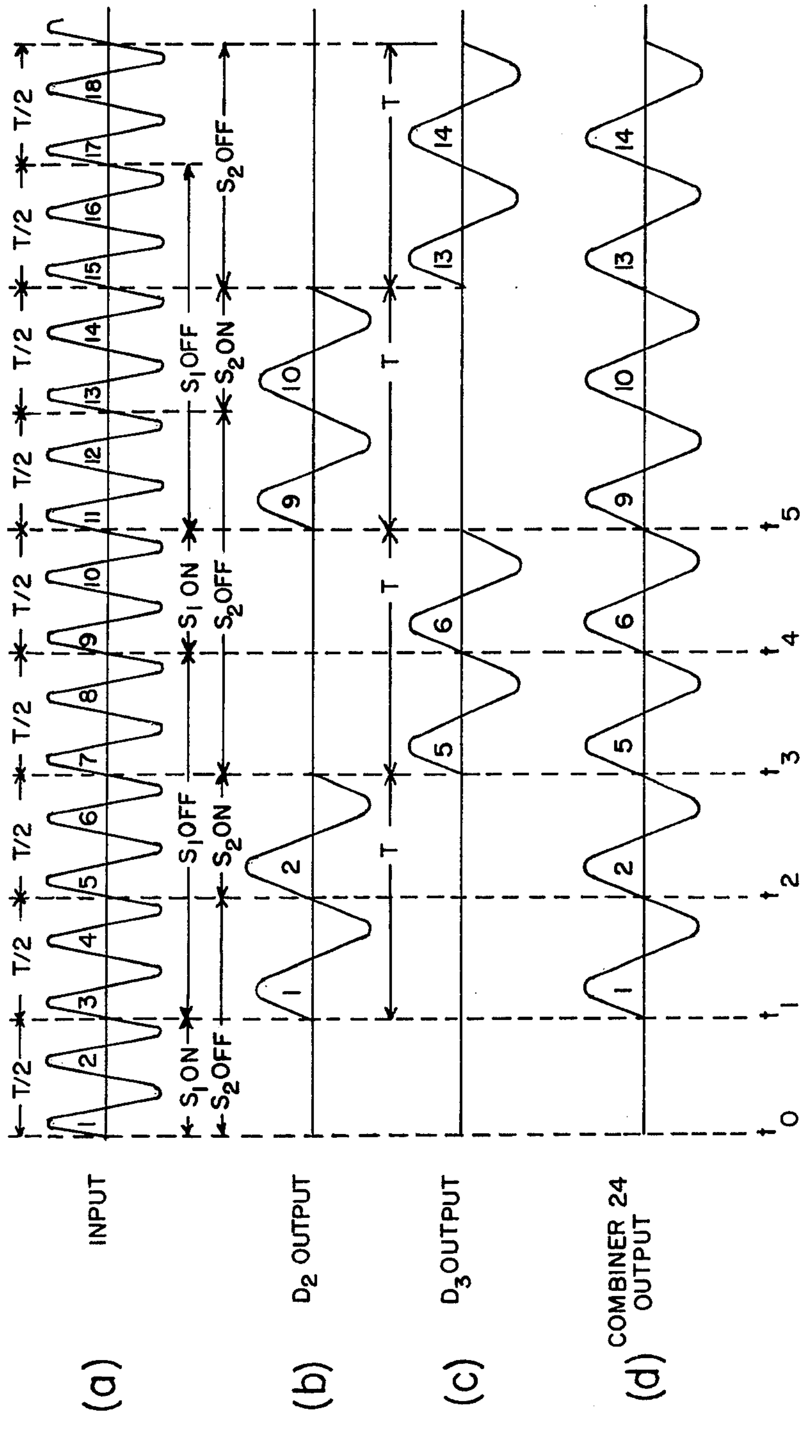
FIGS. 3(*a*) to 3(*d*) show waveforms useful in describing the operation of the processor of FIG. 1.
Figure 4:
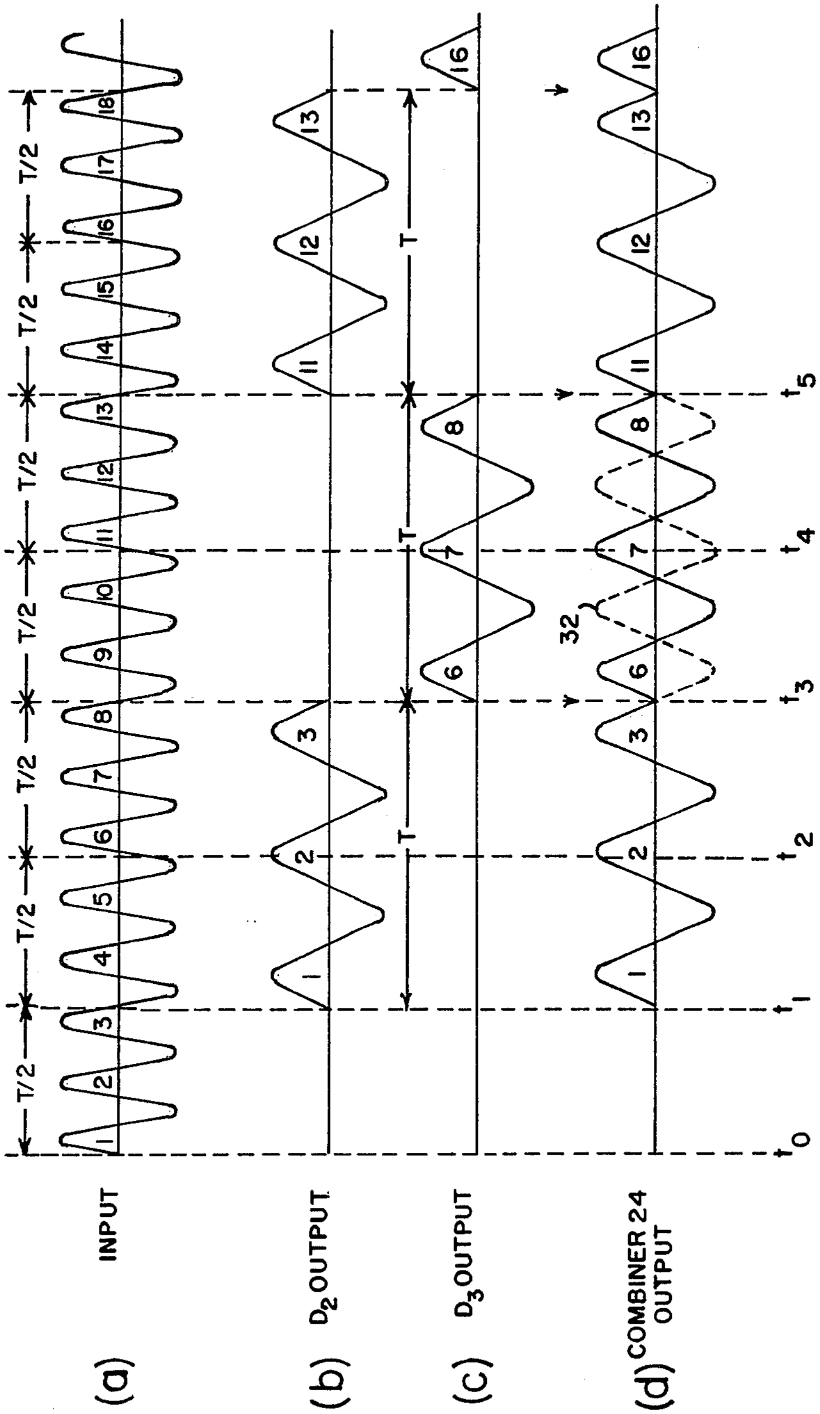
FIGS. 4(*a*) to 4(*d*) show waveforms useful in describing the operation of the signal processor of FIG. 1.

The operation of the speech signal processor will be described below in detail with reference to FIGS. 3 and 4. Line (*a*) of FIG. 3 illustrates the reproduction of one frequency component of the recorded speech signal with the magnetic tape being played back at twice the original recording rate (the compression ratio a = 2). It is to be noted that this particular frequency component is permitted to pass through comb filter 14 with its analog shift register D1 being clocked by the clock frequency $2f_c$. During the sampling time, $t_0 - t_1$, when the electronic switch $S_1$ is "ON", since the electronic switch $S_3$ is in the position A, the analog shift register D2 operates to store the sampled input signal train, i.e., cycles 1 and 2, as viewed in line (*a*) of FIG. 3, with the delay clock frequency $2f_c$. No sampling of the comb filter output takes place during the time interval, $t_1 - t_2$, since both $S_1$ and $S_2$ are kept "OFF" by the control signals received from the switch control circuit 18. At time $t_1$, the electronic switch $S_3$ is changed over to the position B to couple the scan clock signal $f_c$ to the analog shift register D2 whereby the stored speech signal train is sequentially read out from the shift register responsive to the scan clock signal. This results in a signal waveform as shown in line (*b*) of FIG. 3. Since the output scan clock frequency $f_c$ is selected to be equal to half the input delay clock frequency $2f_c$, the stored speech signal train is effectively stretched into a waveform which occupies the original recorded time and which contains cycles 1 and 2 at their original recorded frequency. At point of time $t_2$, the electronic switch $S_2$ is turned "ON" while at the same time the electronic switch $S_4$ is changed over to the position A. This will cause the sampled speech signal train, i.e., cycles 5 and 6 to be sequentially stored or written into the analog shift register D3. During the time interval, $t_3 - t_5$, the stored speech signal train is likewise read out from the analog shift register D3 with the output scan clock frequency $f_c$ to form the signal as shown in line (*c*) of FIG. 3. The signals derived from the frequency-time transformation of the sampled speech signal by the analog shift registers D2 and D3 are applied to the inputs of the combiner circuit 24 for synthesis to provide the output signal as shown in line (*d*) of FIG. 3. It will be understood from FIG. 3 that when the compression ratio is equal to two the signal processor operates to reproduce the particular frequency component of the recorded signal at its original frequency by retaining half and discarding half the amount of the original signal, the discarded portions including cycles, 3, 4; 7, 8; and 11, 12; etc.

It should be noted that for this particular frequency component the length of each sampling time T/2 of the electronic switches $S_1$ and $S_2$ includes two full cycles. Where each sampling time T/2 includes an integer number of cycles, it will be appreciated that there results a smooth transition between the end and the start of two successive stretched waves, for example, the end of cycle 2 and the start of cycle 5 or the end of cycle 6 and the start of cycle 9. As will be described later in detail, the comb filter of the present signal processor is arranged so that those frequencies which do not cause any discontinuities between two adjacent stretched waves will be permitted to pass through the filter.

For any higher frequency components in the speech signal more cycles will be contained in each sampling time. In line (*a*) of FIG. 4 which illustrates the reproduction of another frequency component of the recorded signal two and one-half cycles per sampling time is indicated. When this frequency component is subjected to frequency transformation by the analog shift register D2 and D3, the sampling will cause a disruptive discontinuity between two contiguous concatenated samples, for example, cycles 3 and 6 or cycles 8 and 11, as indicated in line (*d*) of FIG. 4. These discontinuities have a tendency to produce distortion or intermodulation with the desired signal and may cause distracting noise components and severely degrade the system performance. In accordance with the concept of this invention, those frequencies which would produce such discontinuities are filtered out by the comb filter before the speech signal enters the shift registers which perform the frequency transformation.

The basis for the noise suppression provided by the comb filter at the input side of the signal processor can be derived as follows. Consider a sine wave $V = E\sin\nu t$ recorded with a tape recorder. If the tape is played back at a times the original recording rate, the result is $$V = E\sin a\nu t \qquad (1)$$

where *a* is the compression ratio. Assuming that the signal processor does not include a comb filter such as one shown in FIG. 1, the signal (1) when applied to the signal processor becomes $$V = E\sin\omega t \qquad (2)$$

It is to be noted that if $\omega = \nu$, the signal (2) is a signal component, and if $\omega \neq \nu$ the signal (2) is a noise component. The relative amplitudes of the signal and noise components, $S(\nu)$ and $S(\omega)$, respectively, are given as follows.

(A) Signal component ($\omega = \nu$)

If $(a - 1)\nu T = 2n\pi$ $(n = 1, 2, 3 \ldots)$, $$S(\nu) = 1 \text{(the signal component only)} \tag{3}$$

If $(a + 1)\nu T = 2n\pi$ $(n = 1, 2, 3 \ldots)$, $$S(\nu) = \sin(2n/a + 1)/(2n/a + 1) \tag{4}$$

(B) Noise component ($\omega \neq \nu$)

$$S(\omega) = K\sin[(a - 1)\nu T/2] \tag{5}$$

where
$\omega = (2n\pi/T) - a\nu$ or $(2m\pi/T) + a\nu$,
$n, m$ = any integer number satisfying $\omega \geqq 0$, and
$K$ = a constant determined by $\omega$.

If, on the other hand, the signal (1) is passed through the comb filter 14 having the frequency response defined as $2\cos[(a - 1)\nu T/2]$ prior to frequency transformation, the relative amplitude of the signal component (3) is increased by a factor of two while that of the noise component is as follows.

$$S(\omega) = K\sin[(a - 1)\nu T] \tag{6}$$

Thus, it should be appreciated that the use of the comb filter at the input side of the signal processor in accordance with the present invention will reduce the amount of noise to approximately half that produced without the comb filter.

In the case of the signal processor incorporating the comb filter of FIG. 5, the signal component (3) is $$S(\nu) = 2^{k+1} \tag{7}$$

and, the noise component (4) is $$S(\omega) = K\sin[2^k(a - 1)\nu T] \tag{8}$$

where $k = 0, 1, 2, \ldots$. Thus, it will be understood that if the comb filter of the type shown in FIG. 5 is provided at the input side of the signal processor, the noise components are decreased by a factor of $2^{k+1}$.

It should be noted that when the compression ratio a is equal to two, the sampling period T may be in the range of 2 to 10, preferably 4, m sec, while in the case the compression ratio a is equal to three, the sampling period T may be in the range of 1 to 5, preferably 2, m sec. In other words, the desired sampling period T is $$2 \text{ msec} \leqq (a - 1)T \leqq 10 \text{ msec.}$$

Figure 7:
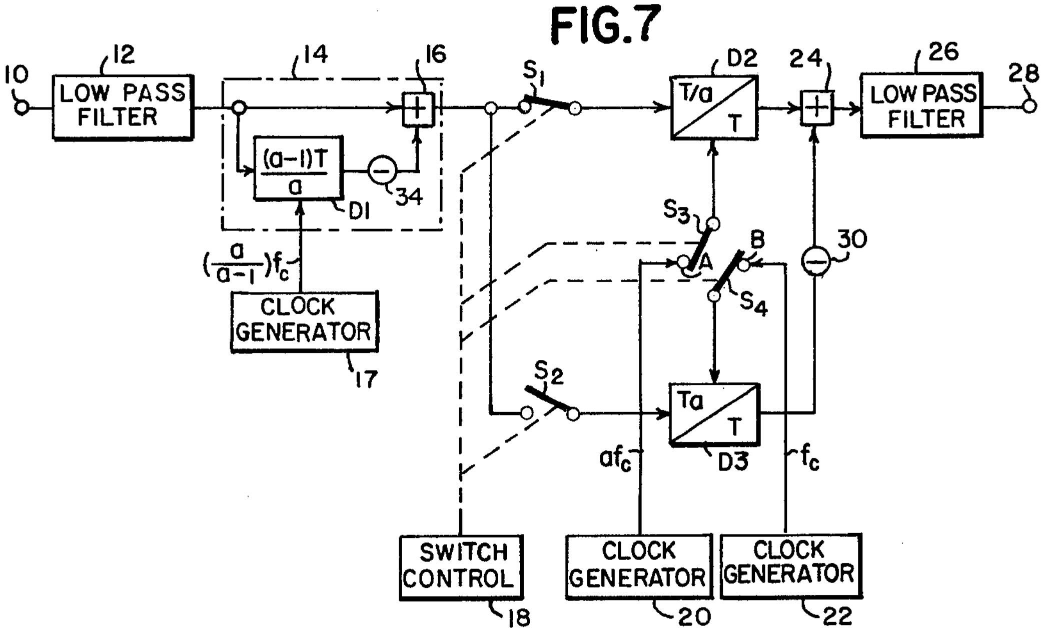
FIG. 7 shows a block diagram of a modification of the signal processor of FIG. 1.
Figure 8:
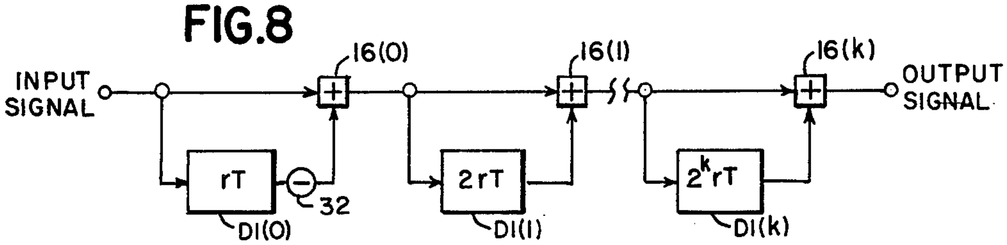
FIG. 8 shows a block diagram of a multi-stage feed-forward type comb filter which can be used in place of the comb filter shown in FIG. 7.

Reference is now made to FIG. 7 which illustrates a modification of the signal processor shown in FIG. 1. An inverter 30 has been introduced to apply the inverted output of the analog shift register D3 to the combiner circuit 24 so as to cause a smooth transition when speech signal samples are reassembled. This will best be understood from line (*d*) of FIG. 4 which depicts in dotted lines 32 in inverted output of the analog shift register D3. Since, in this embodiment, the particular frequency component shown in line (*a*) of FIG. 4 should not be filtered out contrary to the embodiment of FIG. 1, the comb filter 14 additionally includes an inverter 34 which is connected to the output of the analog shift register D1 to apply the inverted shift register output to the adder 16. FIG. 8 illustrates a comb filter configuration which can be employed in place of the comb filter 14 shown in FIG. 7. The comb filter as depicted comprises a *k*-stage feed-forward circuit, each stage consisting of a shift register D1(0), D1(1), . . . **D1(*k*) and an adder 16(0), 16(1), . . . 16(*k*)** for arithmetically combining delayed and undelayed signals. The resulting frequency response of the comb filter is defined as $$\beta = 2^{k+1} \cdot \sin(r\omega T/2)\cos(r\omega T) \ldots \cos(2^{k-1} \cdot r\omega T)$$

Alternatively, the comb filter configuration of FIG. 6 can also be used as the comb filter of FIG. 7 with the selection of the coefficient multiplied by the multipliers 17(0), 17(1), . . . 17(k) to be equal to −1.

Figure 9:
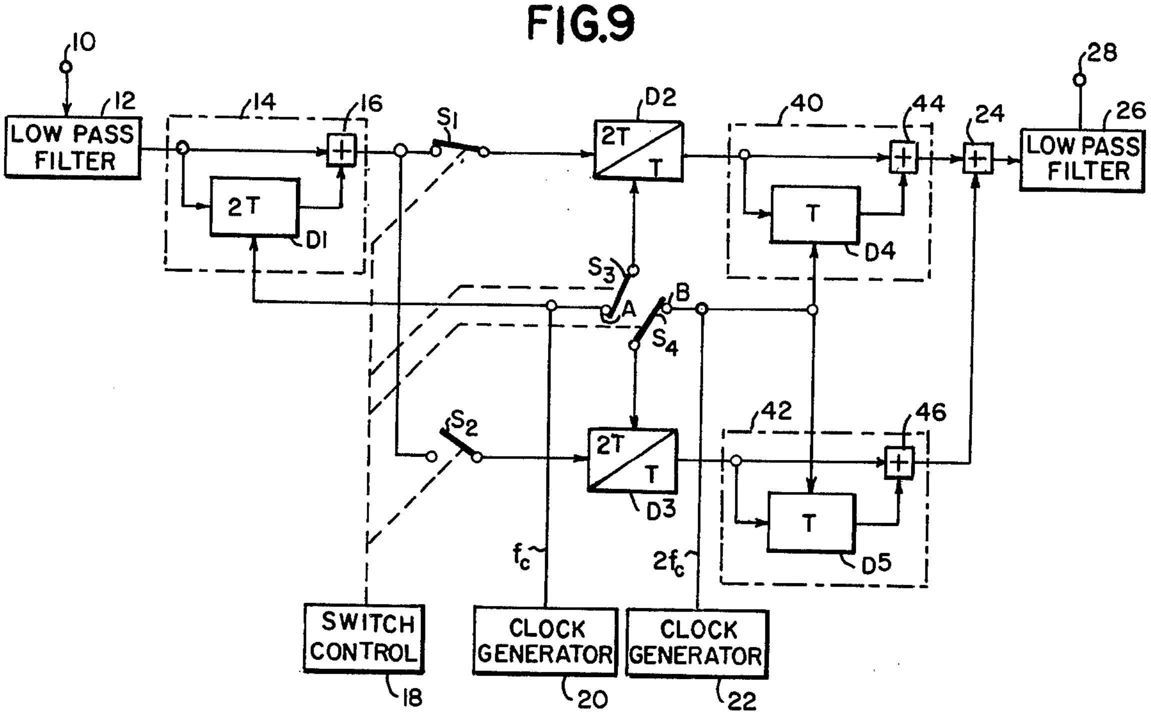
FIG. 9 shows a block diagram of a speech signal processor in accordance with the invention with gap filling provided by a delay unit connected to the output of each analog shift register.

Reference is now made to FIG. 9 which illustrates a block diagram of a signal processor which permits speech signal inputs to be compressed in time with the appropriate frequency transformation so that they may be reproduced in audible form with the desired frequency components. In this embodiment, the speech signal, prior to entering the processor at an input terminal 10, has been subjected to time expansion with the tape having the speech signal recorded thereon being played back at half the original recording rate. The speech signal is low pass filtered by a filter 12 and then is supplied to a comb filter 14 which is similar to the comb filter of FIG. 1. The comb filter 14 includes an analog shift register D1 operating at a clock frequency $f_c$ to provide a delay time equal to 2T.

Figure 10:
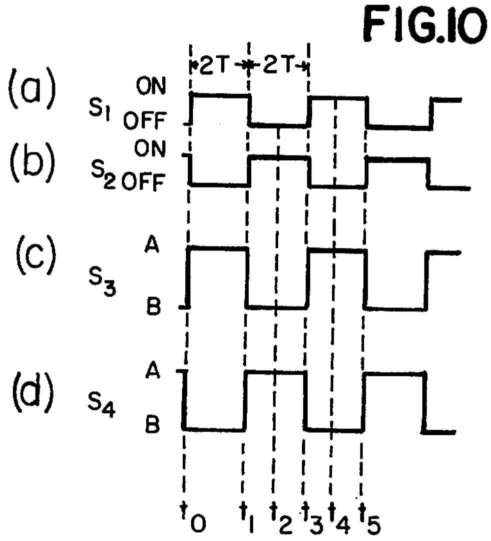
FIGS. 10(*a*) to 10(*d*) show graphically the operation of electronic switches $S_1$, $S_2$, $S_3$ and $S_4$ employed in the signal processor of FIG. 9.

The resultant filtered signal from the comb filter 14 is supplied through signal controlled electronic switches $S_1$ and $S_2$ to analog shift registers D2 and D3 where they are subjected to the frequency transformation required for restoring the original frequency components of the speech signal. The operation of the electronic switches $S_1$ and $S_2$ and another pair of electronic switches $S_3$ and $S_4$ adapted to alternately couple an input delay clock and an output scan clock to the analog shift registers is indicated in lines (*a*), (*b*), (*c*) and (*d*) of FIG. 10. The input delay clock and output scan clock frequencies are selected to be equal to $f_c$ and $2f_c$, respectively.

The output from each shift register is supplied to a gap filling circuit 40, 42, the function of which will be described later. Each gap filling circuit comprises an analog shift register D4, D5 for providing a delay time equal to T and an adder 44, 46 for arithmetically combining delayed and undelayed signals. The resultant signals appearing at the outputs of the gap filling circuits 40, 42 are combined by a combiner circuit 24 and then low pass filtered by a filter 26 to produce the signal which is applied to an audio reproducer (not shown).

Figure 11:
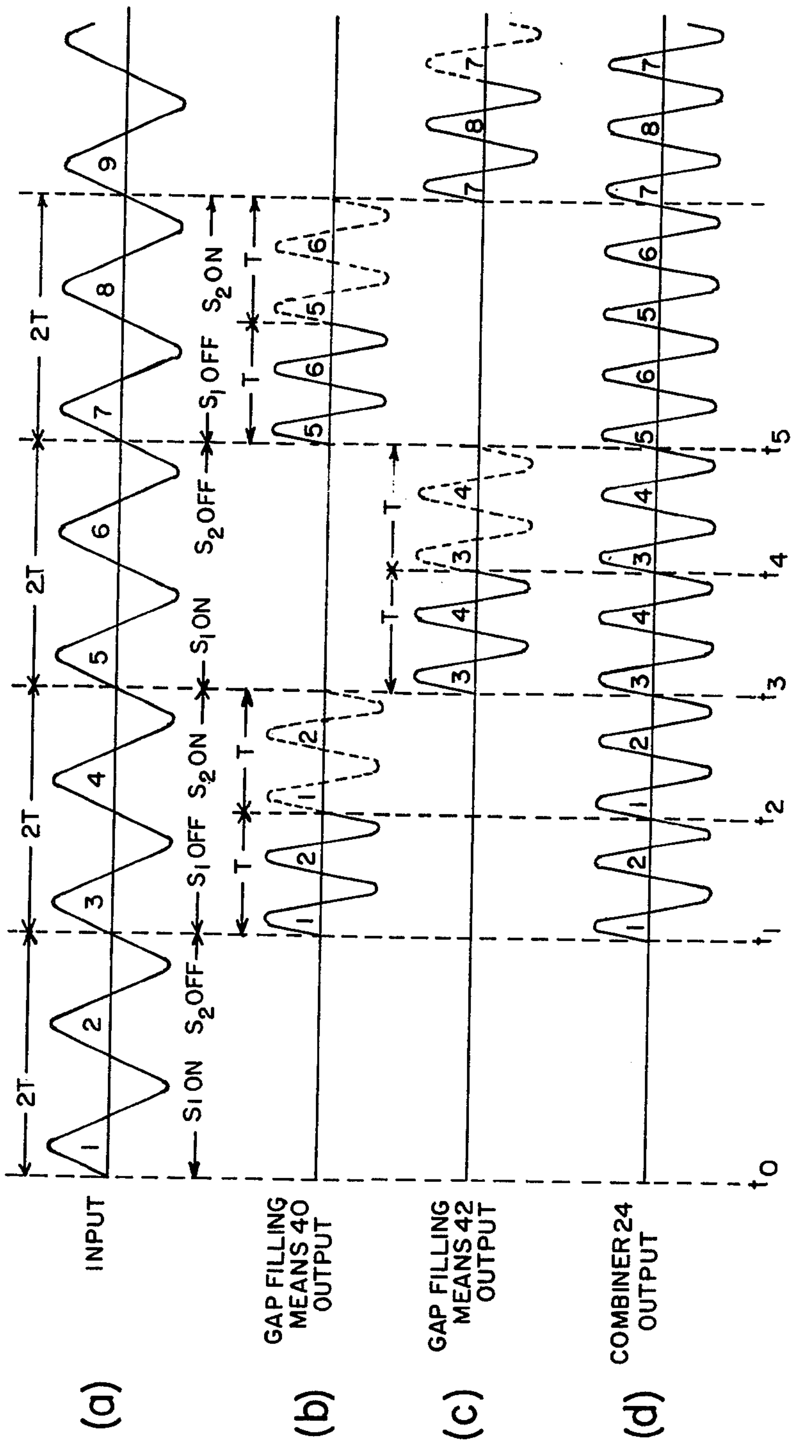
FIGS. 11(*a*) to 11(*d*) show waveforms useful in describing the operation of the signal processor of FIG. 9.
Figure 12:
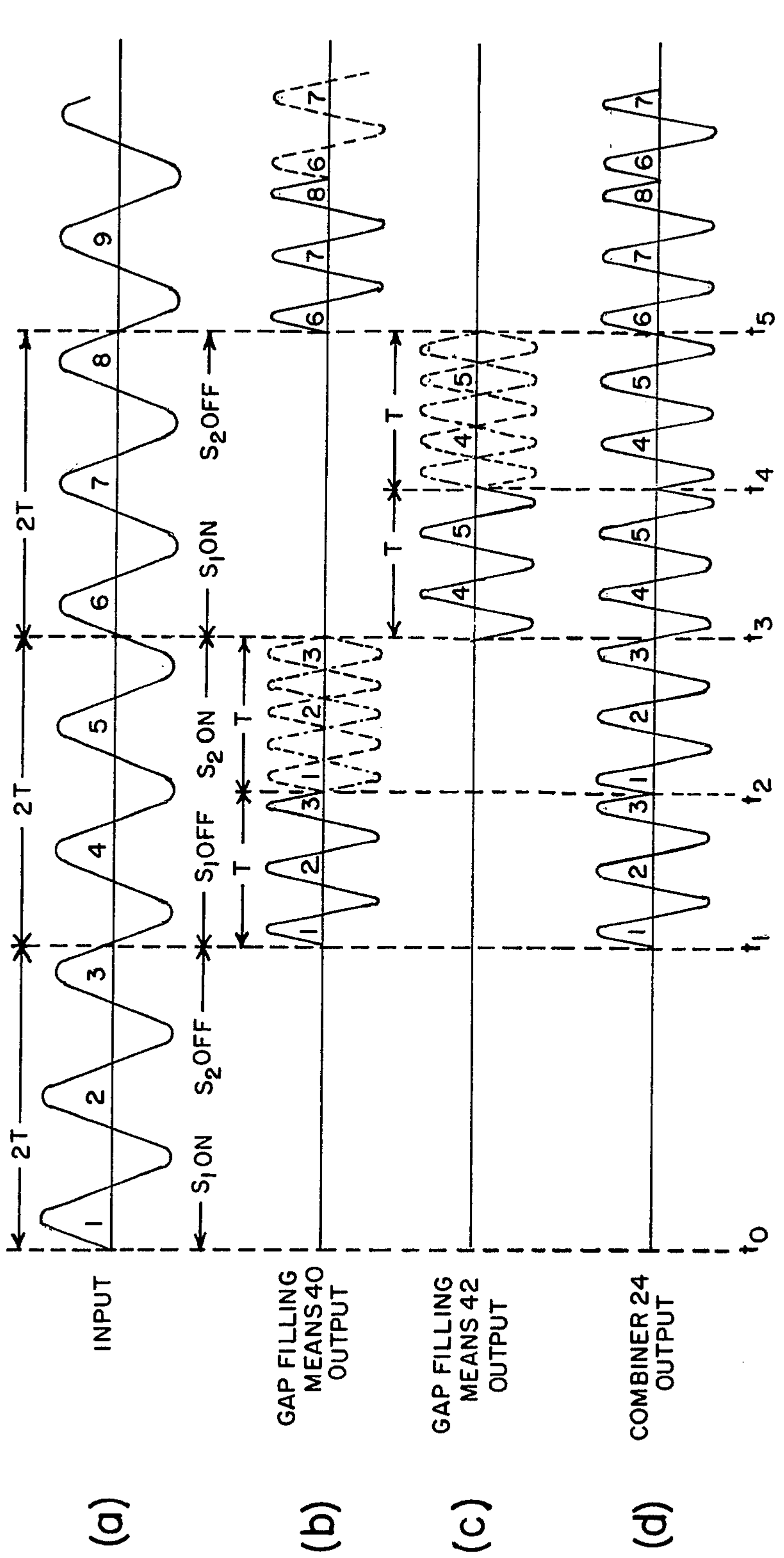
FIGS. 12(*a*) to 12(*d*) show waveforms useful in describing the operation of the processor of FIG. 9.

In line (a) of FIG. 11, there is illustrated the reproduction of one frequency component of a recorded signal being played back at half the original recording speed. As seen, a speech signal train, e.g., cycles 1 and 2 is sampled by $S_1$ during the time interval, $t_0 - t_1$,. Concurrently therewith, the sampled version of the input speech signal is stored in the analog shift register D2 with the delay clock frequency $f_c$. At time $t_1$, the shift register D2 starts to respond to the scan clock signal coupled thereto by $S_3$ by reading out the stored signal train with the scan clock frequency $2f_c$ which is twice the rate at which the sampled signal is stored. The resulting frequency transformed version of the speech signal, as indicated in solid lines in line (*b*) of FIG. 11, is supplied to the gap filling circuit 40 where it is delayed by the analog shift register D4 for a time equal to T. The output of the shift register D4 is indicated in dotted lines in line (*b*) of FIG. 11. The adder 44 arithmetically combines the undelayed and delayed versions of the shift register D2 output. Line (*c*) of FIG. 11 illustrates the output of the gap filling circuit 42 which results from sampling the speech signal during the time interval, $t_1 - t_3$, and then subjecting the samples to frequency transformation. The combiner circuit 24 combines the outputs of the gap filling circuits 40, 42 to produce the waveform as indicated in line (*d*) of FIG. 11. As is understood, since the sampling time is of such a length as to contain an integer number of full cycles, the sampling will not cause a disruptive discontinuity when its samples are reassembled. In accordance with the present invention, the comb filter 14 is so arranged that only those frequencies which do not such discontinuities are permitted to pass through the filter. Line (*a*) of FIG. 12 represents a typical example of speech signal frequency component which is filtered out or suppressed by the comb filter 14. As best seen in line (*d*) of FIG. 12, this particular frequency component when processed will cause a discontinuity at time $t_2$ and $t_4$, which gives rise to objectionable noise.

In the arrangement of FIG. 9, assuming the absence of the comb filter 14, the relative amplitudes of a signal component and a noise component appearing at the output when the input sine wave signal having a angular frequency of $\nu/2$ is applied to the processor are given as (A) Signal component ($\omega = \nu$)

If $\nu T = 2n\pi$, $$S(\nu) = 1 \text{ (signal component only)}$$

If $\nu T = 2n\pi/3$, $$S(\nu) = \tfrac{1}{2}\sin(2n\pi/3)/(2n\pi/3)$$

(B) Noise component ($\omega \neq \nu$)

$$S(\omega) = K\sin(\nu T/2)$$

where $\omega = (2n\pi/T) - \nu/2$ or $(2m\pi/T) + \nu/2$ $n, m$ = any integers satisfying $\omega \geqq 0$, and $K$ = a constant determined by The noise component can be expressed in terms of $\omega$ as follows:

$$S(\omega) = K\sin(\omega T) \text{ or}$$

$$S(\omega) = -K\sin(\omega T)$$

On the other hand, if the comb filter 14 is provided having the response characteristic defined as 2 cos $[(\nu/2)T]$, then the signal component $S(\nu) = 2$ and the noise component $S(\omega) = K\sin(\nu T)$ or $$S(\omega) = K\sin(2\omega T) \text{ or}$$

$$S(\omega) = -K\sin(2\omega T).$$

From the above, it will be appreciated that the use of the comb filter in the signal processor of FIG. 9 reduces noise to half the amount of noise produced without the comb filter.

It should be noted that the multi-stage comb filter configuration of FIG. 5 could be used in place of that of FIG. 9. In this case, if $r = 2$, the signal component is $$S(\nu) = 2^{k+1}$$

and the noise component is $$S(\omega) = K\sin(2^k\nu T)$$

Thus, it will be understood that with the employment of the FIG. 5 filter configuration the reduction of noise relative to signal component is by a factor of $\frac{1}{2}^{k+1}$.

Figure 13:
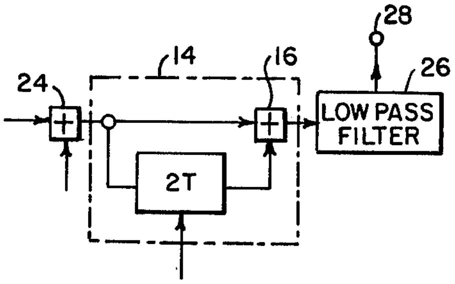
FIG. 13 is a partial block diagram of a speech signal processor in accordance with the invention using a comb filter at the output side of the processor.

In FIG. 13, there is illustrated a partial block diagram of a signal processor which is identical to that of FIG. 9 except that the comb filter 14 is connected between the combiner circuit 24 and the low pass filter 26. With this arrangement also, it is possible to eliminate or substantially reduce splicing noise caused by discontinuities between samples. It will be appreciated that if the multi-stage comb filter of FIG. 5 is used the splicing noise will be further decreased.

Figure 14:
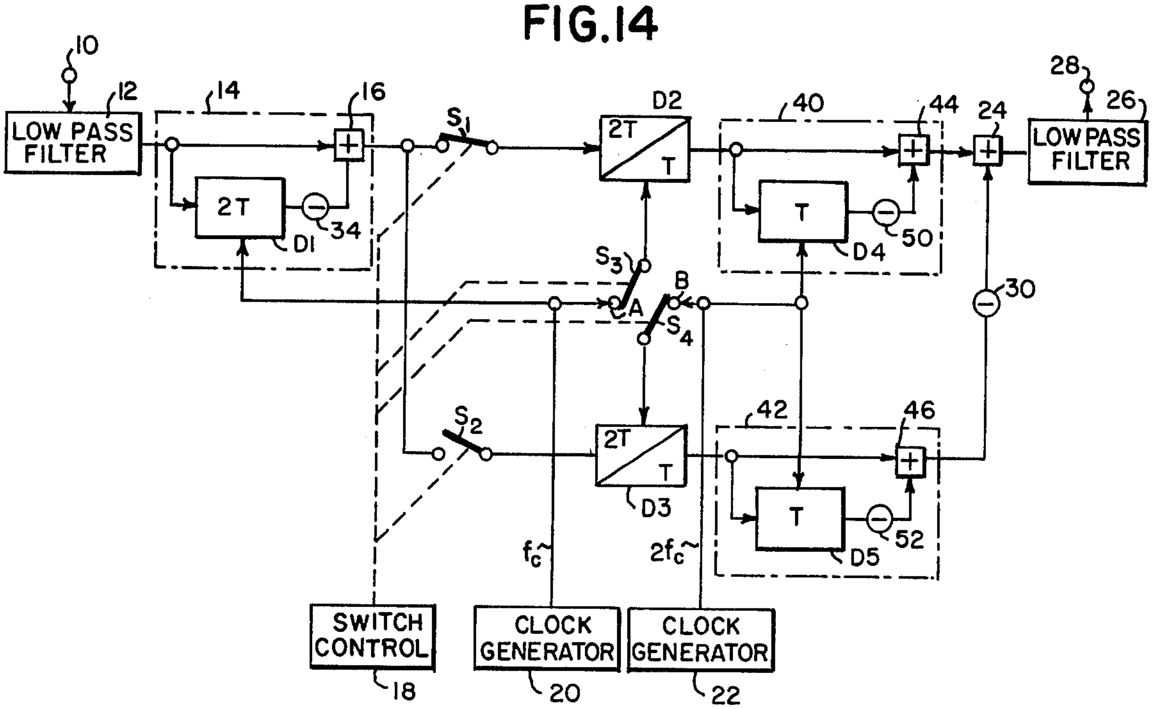
FIG. 14 shows a block diagram of a modification of the processor of FIG. 9.

FIG. 14 illustrates a block diagram of a modification of the signal processor of FIG. 9. This embodiment differs from that of FIG. 9 only in that it additionally includes four inverters. A first inverter 50 is connected between the shift register D4 and the adder 44 in the gap filling circuit 40 to invert the compression waveform delayed by the shift register. The resulting inverted waveform as indicated in dot and dash lines in line (*b*) of FIG. 12 provides a redundant gap filling speech signal which makes a smooth transition from the undelayed speech signal. In a like manner, a second inverter 52 is connected between the shift register D5 and the adder 46 in the gap filling circuit 42 to provide the inverted compression waveform as indicated in dot and dash lines in line (*c*) of FIG. 12. The output from the gap filling circuit 42 is inverted by a third inverter 30 and is applied to the combiner circuit 24 to cause a smooth transition at $t_3$. A fourth inverter 34 is incorporated in the comb filter 14 to modify the frequency response thereof such that those frequency components which include $(n + \frac{1}{2})$ cycles within each sampling time are permitted to pass through the filter.

In this arrangement also, the comb filter 14 could be connected at the output side of the signal processor similar to the embodiment of FIG. 13 and the comb filter configuration of FIG. 8 can be employed.

Figure 15:
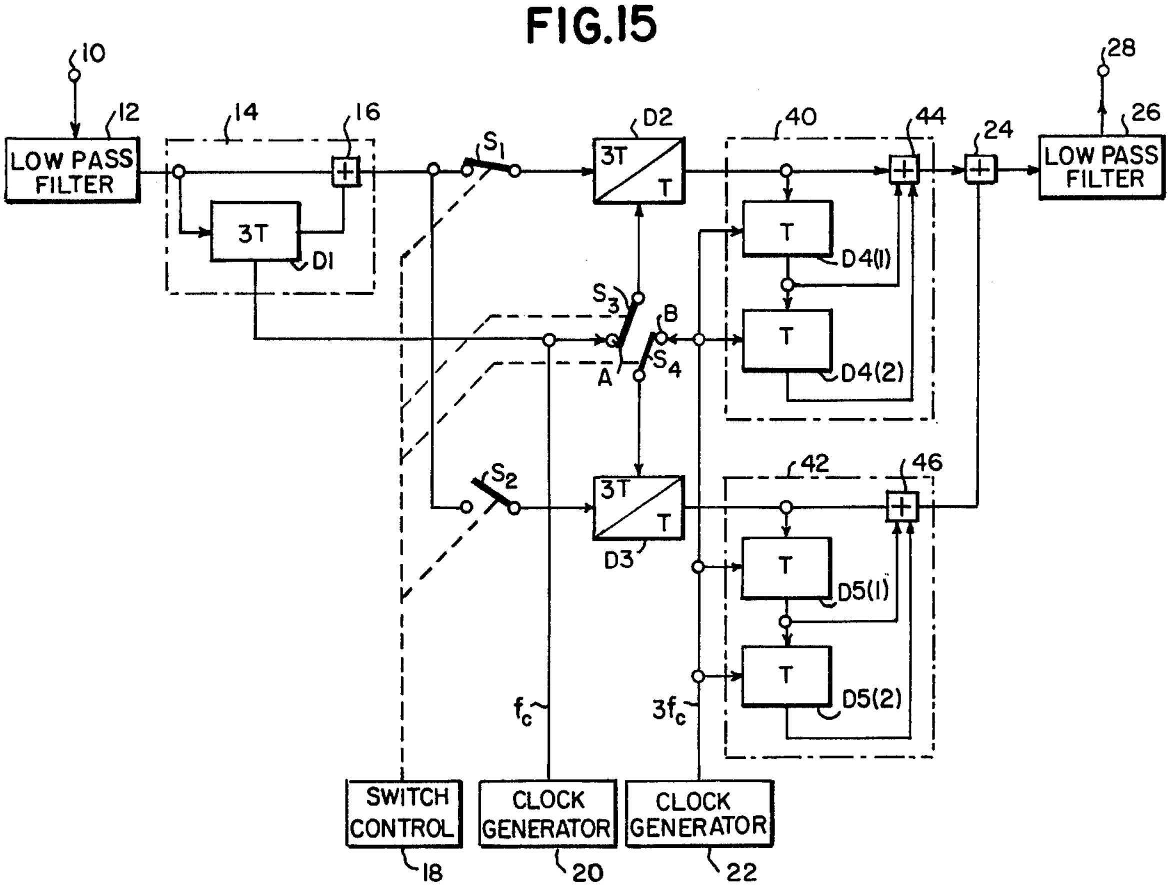
FIG. 15 shows a block diagram of another modification of the processor of FIG. 9 with the ratio of frequency transformation between the signal applied at the input and appearing at the output of the processor being equal to three.
Figure 16:
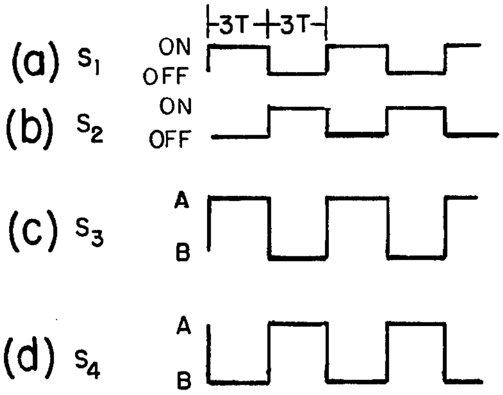
FIGS. 16(*a*) to 16(*d*) show waveforms useful in describing the operation of the signal processor of FIG. 15.

FIG. 15 illustrates a block diagram of a further embodiment of the present invention. In this embodiment, the speech signal derived from playing back the tape having the speech signal recorded thereon at one third the original recording rate is frequency-transformed so that the signal may be reproduced in audible form with the desired frequency components. Assuming that the sampling time is equal to 3T, the analog shift register D1 of the comb filter 14 is required to provide a delay time equal to the sampling time, 3T. To provide such delay, the shift register D1 is clocked by a clock signal $f_c$ received from the clock generater 20. The clock frequency for the read or shift-through operation of the analog shift registers D2, D3 is selected to be equal to $3f_c$ while the clock frequency for the shift-out operation thereof is selected to be equal to $f_c$. It will be appreciated that as a result of the frequency transformation each shift register produces a speech signal waveform occupying a length of time equal to T thus leaving gaps between samples that are of a length equal to 2T. Additional functional components used to fill such gaps with slightly delayed portions of the shift register output comprise two analog shift registers D4(1), D4(2); D5(1), D5(2) each responsive to the clock frequency $3f_c$ to operate as delay circuits. In each gap filling circuit 40, 42, the shift register D4(1), D5(1) operates to delay the frequency transformed version of the speech signal for a time equal to T, and the resulting delayed signal is applied to the shift register D4(2), D5(2) which further delays the signal for a time equal to T. The outputs of the shift registers are supplied to the adders 44, 46. The end result is a continuous wave occupying a length of time equal to 3T and having the original frequency. The operation of electronic switches $S_1$, $S_2$, $S_3$ and $S_4$ is indicated in lines (*a*), (*b*), (*c*) and (*d*) of FIG. 16.

It should be noted that the filter configuration of FIG. 5 could be used in place of the comb filter of FIG. 15 by selecting the coefficient $\nu$ to be equal to 3. Further, it is to be noted that the comb filter may be connected at the output side of the signal processor between the combiner circuit 24 and the output filter 26.

Figure 17:
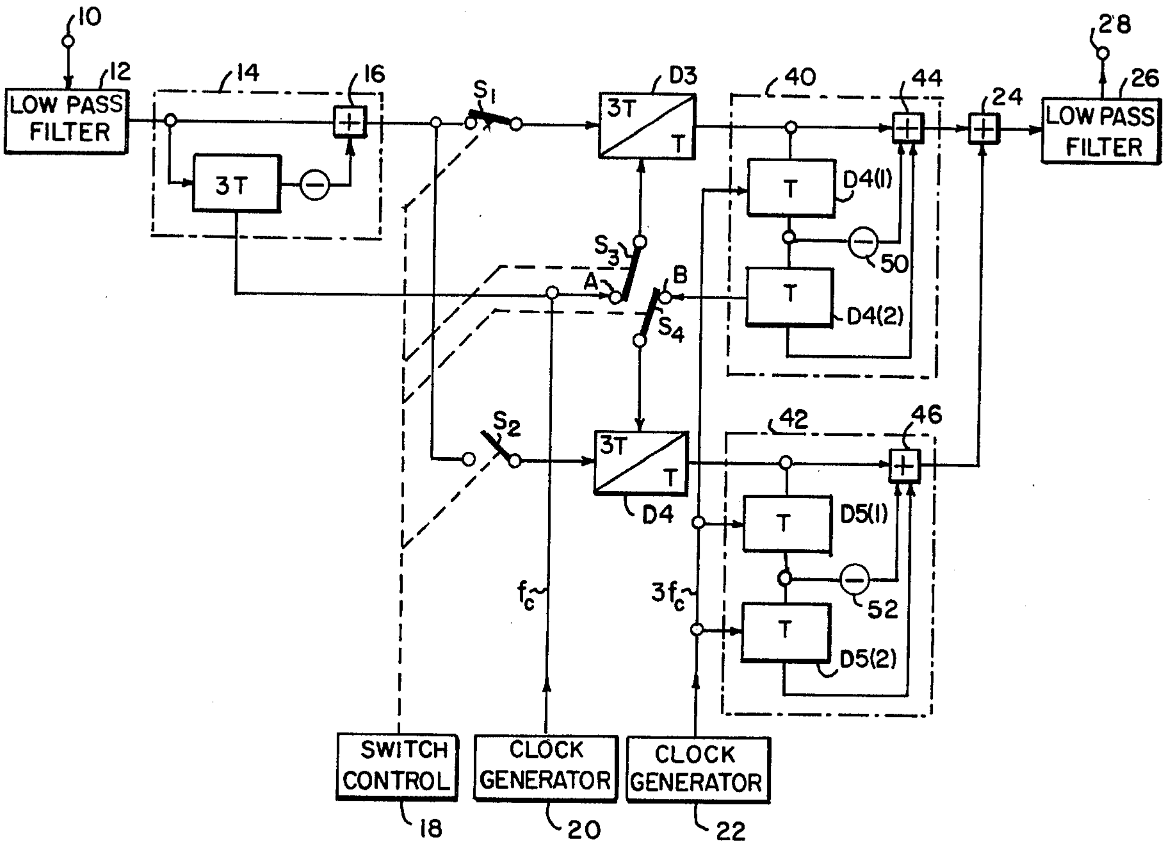
FIG. 17 shows a block diagram of a modification of the processor of FIG. 15.

FIG. 17 illustrates a block diagram of a modification of the signal processor of FIG. 15 which additionally includes three inverters 34, 50, 52. In the comb filter 14, the inverter 34 is connected between the analog shift register D1 and the adder 16. In each gap filling circuit 40, 42, the inverter 50, 52 is connected to invert the output of the shift register D4(1), D5(1). In this embodiment also, it is to be noted that the filter configuration of FIG. 8 can be employed instead of the comb filter of FIG. 17 and that the comb filter can be connected at the output side of the signal processor without degrading system performance.

Figure 18:
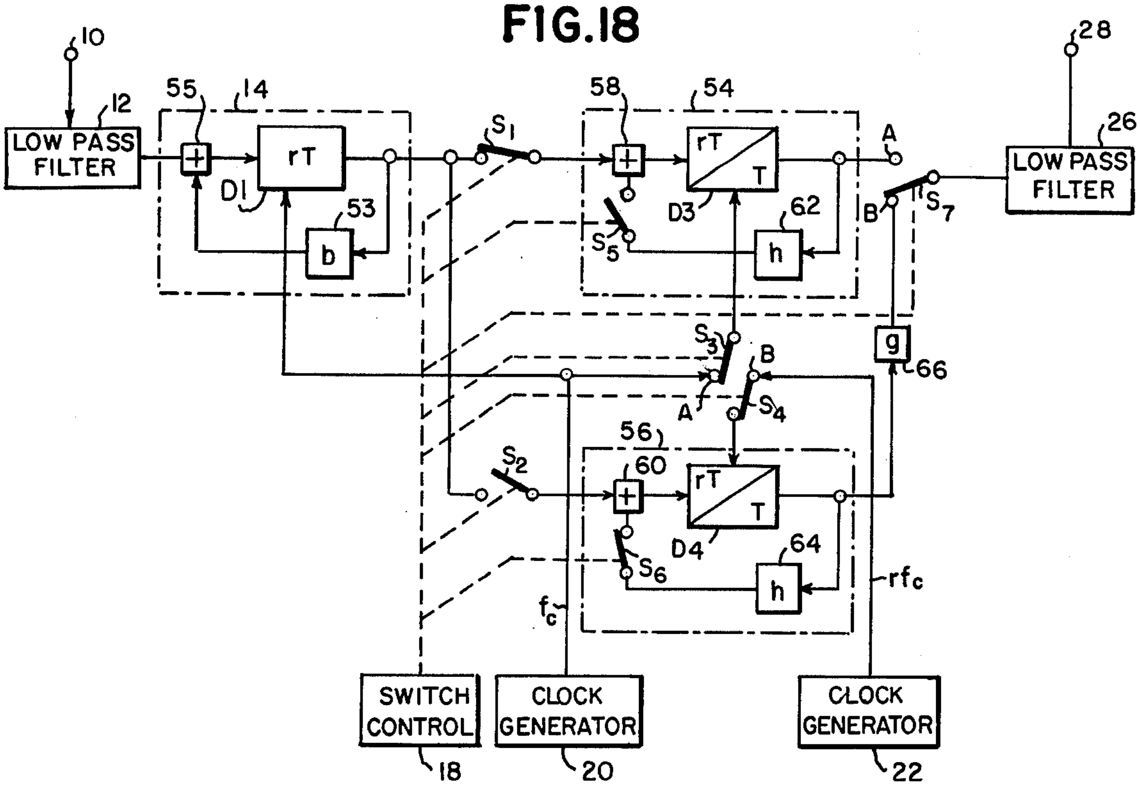
FIG. 18 shows a block diagram of a further modification of the processor of FIG. 19.
Figure 19:
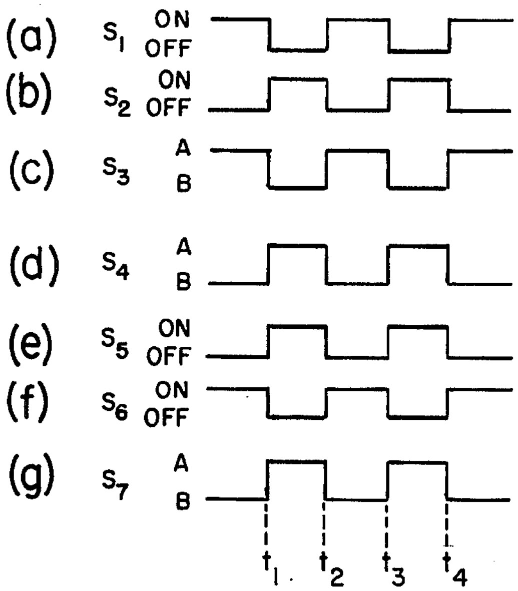
FIGS. 19(*a*) to 19(*g*) show graphically the operation of electronic switches $S_1$ to $S_7$ employed in the processor of FIG. 18.

FIG. 18 illustrates a block diagram of a further embodiment of the present invention which is different from those previously described in the employment of recursive filter 14, 54, 56. In this embodiment, the speech signal to be processed has been subjected to time expansion by playing back the tape at $1/r$ times the original recording rate. The comb filter 14 includes an analog shift register D1 which delays the input signal by the time $r$T and applies it to a multiplier 53. The multiplier 53 multiplies the applied signal by a coefficient $b$ and applies the resulting products to one input of an adder 55, the other input of which is adapted to receive the speech signal from the low pass filter 12. An important feature of the signal processor of FIG. 18 is that each recursive filter 54, 56 provides signal gap filling as well as frequency transformation with the resulting advantage that the number of shift registers required is a minimum. In each recursive filter, a multiplier 62, 64 multiplies the shift register output by a coefficient h and applies the resulting products to one input of an adder 58, 60 through an electronic switch $S_5$, $S_6$. The other inputs of the adders 58, 60 are connected to their corresponding electronic switches $S_1$ and $S_2$. The outputs of the recursive filters 54, 56 are alternately coupled by an electronic switch $S_7$ to the input of the low pass filter 26. A multiplier 66 is provided which multiplies the recursive filter 56 output by a coefficient g and applies the resulting products to the electronic switch $S_7$. FIG. 19 shows the operation of electronic switches $S_1$ to $S_7$.

The coefficients *b*, *g*, *h* multiplied by the multipliers 53, 66, 62, 64 are as follows:

If $0 < b < 1$, $h = 1$ and $g = 1$.

If $0 > b > -1$, $h = -1$ and $g = -(-1)^r$.

It should be noted that in this arrangement also the comb filter 14 could be connected at the output side of the signal processor between the switch $S_7$ and the low pass filter 26.

Various additional modifications and extensions of this invention will now occur to those skilled in the art in view of the broad features of this invention. In particular, it will be appreciated that at least two of the arrangements shown in FIGS. 1, 7, 9, 14, 15 and 17 could be arranged in parallel. The applicant has found that a parallel combination of the arrangements of FIGS. 1 and 7 with the connection of the outputs of the respective input low pass filters 12 and the inputs of the respective output low pass filters 26 performs satisfactorily. Also, a parallel combination of the arrangements of FIGS. 9 and 14 with the connection of the outputs of the respective input low pass filters and the inputs of the respective output low pass filters performs satisfactorily. Similar satisfactory results can be obtained with a parallel combination of the arrangements of FIGS. 15 and 17 with the connection of the outputs of the respective input low pass filters and the inputs of the respective output low pass filters. Referring to FIG. 9, it will be understood that it would be possible to remove one of the gap filling circuits, e.g., 42 and coupling the shift register D3 output to the input of the other gap filling circuit 40. In FIGS. 15 and 17 also, it will be appreciated that one of the gap filling circuits could be dispensed with.

While a description of the present invention has been made with the particular embodiments in which analog shift registers are used as delay elements, it will be obvious to those skilled in the art that other types of delay devices such as digital shift registers, variable delay lines and RAM's (randon access memories) could also be employed with appropriate associated circuitry.

All such variations and deviations which basically rely on the teachings of this invention are properly considered within the spirit and scope of this invention.

What is claimed is:

1. A signal processor for speech signals or the like, comprising:

speech signal channel means;

input means for applying a frequency altered speech signal to said channel means;

frequency transformation means connected in said speech signal channel means for subjecting the speech signal to frequency transformation to restore the desired frequency components of the signal; and comb filter means connected in said speech signal channel means to minimize noise components in the output signal of said signal processor.

2. The signal processor of claim 1 wherein said comb filter means is provided between said input means and said frequency transformation means.

3. The signal processor of claim 1 wherein said comb filter means is provided to process the output signal of said frequency transformation means.

4. The signal processor of claim 1 wherein said comb filter means comprises a feed-forward circuit of at least one stage having a comb signal characteristic, each stage comprising a delay unit for delaying an input signal and an adder for arithmetically combining such delayed signal and undelayed input signal.

5. The signal processor of claim 1 wherein said delay unit comprises an analog shift register.

6. The signal processor of claim 5 wherein said analog shift register is constructed of a bucket brigade device.

7. The signal processor of claim 1 wherein said comb filter means comprises a nonrecursive filter of the tapped-delay line type having a comb signal characteristic.

8. A signal processor for speech signals or the like, comprising:

speech signal channel means;

input means for applying a frequency altered speech signal to said channel means;

first and second sampling means connected in said speech signal channel means in parallel to each other, said first and second sampling means being responsive to control signals to sample alternate portions of the speech signal;

means for generating said control signals to be applied to said first and second sampling means;

first and second shift register means capable of control for frequency transformation and connected to process the outputs of said first and second sampling means, respectively;

combiner means for combining the outputs of said first and second shift register means to provide a composite output signal; and comb filter means connected between said input means and said sampling means to filter out those frequency components which would produce disruptive discontinuities due to sampling and subsequent combining their samples, thereby minimizing noise components in the output signal derived from said combiner means.

9. The signal processor of claim 8 comprising;

a first low pass filter connected between said input means and said comb filter means; and a second low pass filter connected to process the output of said combiner means.

10. The signal processor of claim 8 wherein said comb filter means comprises a feed-forward circuit of at least one stage having a comb signal characteristic, each stage comprising a delay unit for delaying an input signal and an adder for arithmetically combining such delayed signal and undelayed input signal.

11. The signal processor of claim 8 wherein said delay unit comprises an analog shift register.

12. The signal processor of claim 11 wherein said analog shift register is constructed of a bucket brigade device.

13. The signal processor of claim 8 wherein said comb filter means comprises a nonrecursive filter of the tapped-delay line type having a comb signal characteristic.

14. The signal processor of claim 8 wherein said first and second shift register means each comprise an analog shift register.

15. The signal processor of claim 14 wherein said analog shift register is constructed of a bucket brigade device.

16. The signal processor of claim 8 further comprising:

a first inverter connected between said second shift register means and said combiner means; and a second inverter connected between the delay unit and the adder of said comb filter means.

17. The signal processor of claim 10, further comprising:

first gap filling means connected between said first shift register means and said combiner means; and second gap filling means connected between said second shift register means and said combiner means.

18. The signal processor of claim 17 wherein said first and second gap filling means each comprise;

a delay unit for delaying the output of a corresponding shift register means by a predetermined time; and an adder for arithmetically combining the delayed and undelayed versions of the output of the corresponding shift register means.

19. The signal processor of claim 18, further comprising:

a first inverter connected between the delay unit and the adder of said second gap filling means; and a second inverter connected between the delay unit and the adder of said comb filter means.

20. The signal processor of claim 17 wherein said first and second gap filling means each comprise:

a first delay unit for delaying the output of a corresponding shift register means by a predetermined time;

a second delay unit for delaying the output of said first delay unit by the predetermined time; and and adder for arithmetically combining the output of the corresponding shift register means and the outputs of said first and second delay units.

21. The signal processor of claim 20 further comprising:

a first inverter connected between the first delay unit and the adder of said first gap filling means;

a second inverter connected between the first delay unit and the adder of said second gap filling means;

a third inverter connected between said second gap filling means and said combiner means; and a fourth inverter connected between the delay unit and the adder of said comb filter means.

22. A signal processor for speech signals or the like, comprising:

speech signal channel means;

input means for applying a frequency altered speech signal to said channel means;

first and second sampling means connected in said speech signal channel means in parallel and to each other, said first and second sampling means being responsive to control signals to sample alternate portions of the speech signal;

means for generating said control signals to be applied to said first and second sampling means;

first and second shift register means capable of control for frequency transformation and connected to process the outputs of said first and second sampling means, respectively;

combiner means for combining the outputs of said first and second shift register means to provide a composite output signal; and comb filter means connected to the output of said combiner means to filter out those frequency components which have produced disruptive discontinuities due to sampling and subsequent combining their samples, thereby minimizing noise components in the output signal derived from said combiner means.

23. The signal processor of claim 22 wherein said comb filter means comprises a feed-forward circuit of at least one stage having a comb signal characteristic, each comprising a delay unit for delaying an input signal and an adder for arithmetically combining such delayed signal and undelayed input signal.

24. The signal processor of claim 23 wherein said delay unit comprises an analog shift register.

25. The signal processor of claim 24 wherein said analog shift register is constructed of a bucket brigade device.

26. A signal processor for speech signals or the like, comprising:

speech signal channel means;

input means for applying a frequency altered speech signal to said channel means;

first and second sampling means connected in said speech signal channel means in parallel to each other, said first and second sampling means being responsive to control signals to sample alternate portions of the speech signal;

means for generating said control signals to be applied to said first and second sampling means;

first and second recursive filter means capable of control for frequency transformation as well as signal gap filling to process the outputs of said first and second sampling means, respectively;

combiner means for combining the outputs of said first and second recursive filter means to provide a composite output signal; and comb filter means connected in said speech signal channel means to minimize noise components in the output signal of said signal processor.

27. The signal processor of claim 26 wherein said comb filter means is connected between said input means and said sampling means to filter out those frequency components which would produce disruptive discontinuities due to sampling and subsequent combining their samples.

28. The signal processor of claim 26 wherein said comb filter means is connected to process the output of said combiner means.

* * * * *